July 24, 1962 R. C. KELNER 3,046,530
REVERSIBLE MAGNETIC SHIFT REGISTER
Filed Oct. 26, 1955
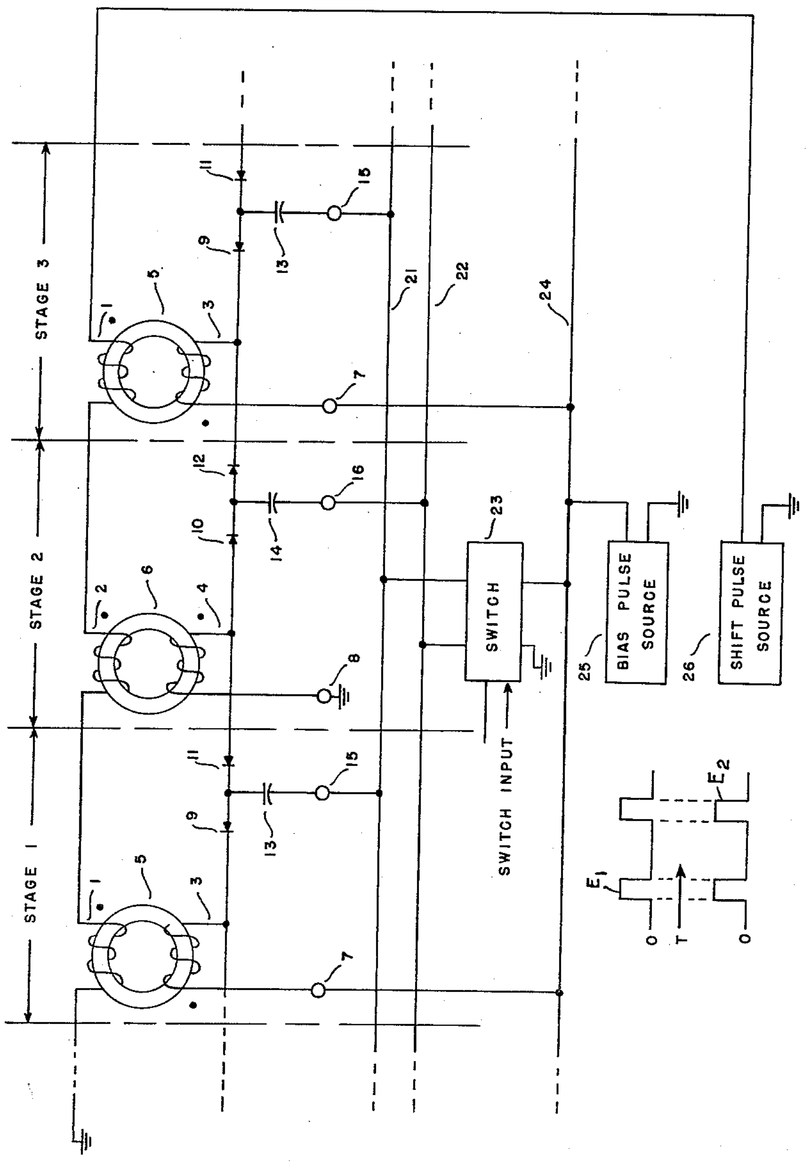
INVENTOR
ROBERT C. KELNER 3,046,530

REVERSIBLE MAGNETIC SHIFT REGISTER

Robert C. Kelner, Concord, Mass., assignor to Laboratory for Electronics, Inc., Boston, Mass., a corporation of Delaware Filed Oct. 26, 1955, Ser. No. 542,829
7 Claims. (Cl. 340—174)

The present invention relates in general to new and improved electrically bistable circuits, in particular magnetic shift registers.

The term magnetic shift register applies to a device employing a series of magnetic cores, each having a substantially rectangular hysteresis characteristic, i.e. the residual flux density of such a core constitutes a large part of the saturation flux density. Accordingly, such cores may exist in one or the other of two magnetic states corresponding to positive or negative residual flux density, arbitrarily labeled the ZERO and the ONE state respectively. Application of the requisite amount of magnetomotive force in one direction, e.g. positive, to a core in the ZERO state will effect no change in the core, while application of the same force in the negative direction will change the core to the ONE state. The reverse situation obtains upon the application of magnetomotive force to a core in the ONE state. The applicability of such bistable cores to the processing of information reduced to coded bits is at this time well established in the art.

In magnetic shift registers, a series of cores are electrically linked so that binary information on any one core may be passed on to the succeeding core, upon the application of a shift pulse simultaneously applied to all the cores in the series. Such a shift pulse is applied to individual coils wound upon the respective cores, thereby producing the necessary magnetomotive force to change the magnetic state of the cores, as explained above. If the application of the shift pulse changes the magnetic state of the core, the shift pulse winding will appear as a primarily resistive impedance to the source. If, however, no change is effected in the magnetic state of the core, the winding will appear as a short circuit to the source.

In the operation of magnetic shift registers it is often desirable to reverse the flow of information, i.e., to transfer information at will to the core of a preceding stage instead of to the core of a succeeding stage. In prior art devices, once a bit of information has passed from a first core to a subsequent core in the series, the only way to return that bit of information to the first core, is to recirculate the information entirely through the register. This is done by applying shift pulses to transfer the bit of information in question stepwise down to the last core in the series of the magnetic shift register, taking the output of the last stage of said register and feeding it to the input terminal of the first stage of the register, and applying further shift pulses to transfer the information until the bit in question has reached the desired core. This process is time consuming and wasteful of energy. I have invented a circuit which overcomes these disadvantages by enabling the selective transfer of information in the forward or backward direction. In one application of my invention, my circuit serves as the translating link between the operator and a machine which processes information in binary code. When carrying on calculations with binary coded numbers, it is desirable to operate first on the least significant figure of the number. The tendency of the operator however, who is primarily versed in the decimal system, is to write down the most significant figure first. My invention eliminates errors in binary code calculations by enabling the operator to initiate a number with the least significant figure, as required by the machine, without the necessity of retraining him to think in terms of the binary code.

Accordingly, it is an object of my invention to provide a new and improved shift register which is not subject to the foregoing disadvantages.

It is another object of my invention to provide a shift register which will enable the operator to carry on calculations in his accustomed thought process.

It is a further object of my invention to provide a shift register which will enable the operator to reverse the flow of information at will.

Briefly stated, the magnetic shift register of my invention contemplates the selective application of bias voltages to unilaterally conductive means linking respective stages of the register, thereby limiting the transmission of information to a chosen one of two predetermined directions.

These and other novel features of my invention, together with further objects and advantages thereof, will become more apparent from the following detailed specification with reference to the accompanying drawing, the single FIGURE of which illustrates the invention.

Three successive stages of a reversible magnetic shift register are illustrated in the drawing, alternate stages being identical in construction and being labeled accordingly. It will be understood that any number of stages is possible. Magnetic cores 5 and 6 have a substantially rectangular hysteresis characteristic, and are capable of existing in one of two predetermined magnetic states. Shift pulse windings 1 and 2 respectively are wound on respective magnetic cores 5 and 6 and are adapted to be excited from source 26 to supply shift pulses $E_2$ to the cores. Although shift pulse windings 1 and 2 are shown to be series connected for excitation from the source, my invention is not limited thereto and could equally well employ a parallel drive system, such as is disclosed in my co-pending application No. 542,968, filed on October 26, 1955. Cores 5 and 6 further carry bias windings 3 and 4, respectively, the respective winding terminals which are marked by a dot in the drawing, being in phase with each other when voltage is applied. Winding 3 has one end connected to a first junction point and the other end connected to a bias terminal 7. Unilaterally conductive means 9, which may be a diode rectifier, is connected between said first junction point and a second junction point. A storage condenser 13 is connected between the second junction point and a bias terminal 15. A second diode rectifier 11 is connected between the second junction point and a third junction point in Stage 2. Diode rectifiers 9 and 10 are poled alike for current conduction in a reverse direction. Bias winding 4 on core 6, has one end connected to the third junction point and the other end connected to a bias terminal 8. Diode rectifier 10, in Stage 2, is connected between the third junction point and a fourth junction point. Storage condenser 14 is connected between the fourth junction point and a bias terminal 16. Diode rectifier 12 is connected between the fourth junction point and a fifth junction in Stage 3. Diode rectifiers 10 and 12 are poled alike for current conduction in a forward direction. Bus 24 is adapted to be excited from bias pulse source 25, which puts out pulses $E_1$ in synchronism with the shift pulses $E_2$. Terminal 7 of bias winding 3 is connected to bus 24, while terminal 8 of bias winding 4 is connected to ground. Switch 23 selectively connects one of buses 21 or 22 to bus 24, while connecting the other bus to ground. Bias terminals 15 and 16 are respectively connected to buses 21 and 22. Bias terminals 7, 15 and 16 may be excited from separate sources but the respective bias pulses so applied must be of equal amplitude and must further be in synchronism with the shift pulses. Accordingly, switch 23, schematically indicated in the drawing as one unit, may consist of two separate synchronized units. Switch 23 may employ any well known electronic means to carry out its function, gate circuits as well as transistors having been found feasible.

The operation of the circuit is as follows: For transmission of information in the forward direction, switch 23 is set to excite bus 21, leaving bus 22 connected to ground. The application of a shift pulse to core 5 transfers any information thereon in the form of a pulse to condenser 13, the polarity of such pulse being determined by the polarity of winding 3 and being such as to make the second junction point negative with respect to bias terminal 15. Diode rectifier 11 is rendered nonconductive during the shift pulse period by the application of positive bias pulse $E_1$, received from bus 21 by way of condenser 13, while diode rectifier 9 remains conductive during the same period because of the neutralizing effect of the bias voltage applied via bias terminal 7. Following the pulse period, diode rectifier 11 becomes conductive and information on condenser 13 is transferred to core 6 by way of bias winding 4. Such transfer of information, as just described between Stages 1 and 2, occurs only when core 5 is in the ONE state at the time the shift pulse is applied. If core 5 is in the ZERO state upon application of the shift pulse, shift pulse winding 1 appears as a short circuit to the current and no voltage develops thereacross. Consequently, in such case, the magnetization of core 5 remains ZERO. Returning now to the operation described before, it will be seen that information on core 6 in Stage 2 is transferred in similar manner to core 5 in Stage 3. Specifically, for the same setting of switch 23, i.e. with a bias pulse applied to bus 21 and bus 22 connected to ground, the application of the next shift pulse $E_2$ to winding 2 of core 6, will reset the latter to the ZERO state provided it was in the ONE state. By transformer action, the pulse so applied appears on that terminal of winding 4 which is connected to diode 10. Diode 10 is rendered conductive and the pulse is transferred to condenser 14. Owing to the opposite poling of winding 4 as compared to winding 3, the output pulse will be opposite in polarity to that in Stage 1. Accordingly, condenser 14 will charge in the opposite direction, making junction point 4 positive with respect to bias terminal 16. It will be seen that the direction of magnetization of ONES and ZEROS on core 6 is opposite to that on core 5.

If it is now desired to transfer information in the backward direction, switch 23 is actuated to excite bus 22 with bias pulses, leaving bus 21 connected to ground. The application of a shift pulse will then transfer information on core 5 of Stage 3 to condenser 14 making the fourth junction point positive with respect to bias terminal 16. As soon as the pulses subside, diode rectifier 10 will be rendered conductive and permit condenser 14 to discharge, thereby transferring its information to core 6 by way of bias winding 4. A similar process occurs in the transfer of information from core 6 to core 5 of Stage 1, respective directions of magnetization of the cores again being mutually opposite. The bias voltage on bus 22 now operates to make diode rectifier 10 nonconductive during the pulse period, diode rectifier 12 remains conductive owing to the neutralizing effect of the bias voltage applied via terminal 7.

Having thus described my invention, it will be apparent that numerous modifications and departures may now be made by those skilled in the art. Consequently, the invention herein disclosed is to be construed as limited only by the spirit and scope of the appended claims.

I claim:

1. In a magnetic shift register for processing information, first and second bistable magnetic cores, each core having a substantially rectangular hysteresis characteristic, means including a shift pulse winding on each of said cores for applying shift pulses thereto, a first bias winding having two terminals wound on said first magnetic core, said first bias winding having one terminal connected to ground and the other terminal connected to a first junction point, unilaterally conductive means comprising first and second unilaterally conductive elements connected between said first junction point and a second junction point, a second bias winding having two terminals wound on said second magnetic core, said second bias winding having one terminal connected to said second junction point, means for applying bias pulses to the other terminal of said second bias winding, a third unilaterally conductive element connected between said second junction point and a third junction point, said second and third unilaterally conductive elements being poled to conduct current in mutually opposite directions, means for selectively applying bias pulses to said unilaterally conductive elements, said bias pulses being determinative of the conductivity thereof; whereby information stored in a selected one of said cores is transferred to the other core upon the application of said shift pulses.

2. In a magnetic shift register for processing information, first and second bistable magnetic cores, each core having a substantially rectangular hysteresis characteristic, means including a shift pulse winding wound on each one of said cores for applying shift pulses thereto, a first bias winding having two terminals wound on the first one of said cores, said first bias winding having one terminal connected to ground and the other terminal connected to a first junction point, a first serially connected combination comprising first and second unilaterally conductive elements poled alike for current conduction in one direction, said first combination being connected between said first junction point and a second junction point, means for selectively applying a first bias voltage to said first combination, a second serially connected combination comprising third and fourth unilaterally conductive elements poled alike for current conduction in a direction opposite to that of said first combination, said second combination being connected between said second junction point and a third junction point, means for selectively applying a second bias voltage to said second combination, a second bias winding having two terminals wound on the second one of said cores, said second bias winding having one terminal connected to said second junction point, means for applying a third bias voltage to the other terminal of said second bias winding, said third bias voltage neutralizing the effect of said first and second bias voltages respectively upon said second and third unilaterally conductive elements, said bias voltages being applied while the shift pulse endures to determine the conductivity of said unilaterally conductive elements, whereby information in a selected one of said cores is transferred to the other core upon the application of said shift pulses.

3. In a magnetic shift register for processing information, first and second magnetic cores, each core having a substantially rectangular hysteresis characteristic, means including a shift pulse winding on each of said cores for applying shift pulses thereto, a first bias winding having two terminals wound on the first one of said cores, said first bias winding having one terminal connected to ground and the other terminal connected to a first junction point, a first unilaterally conductive element connected between said first junction point and a second junction point, means including a first storage condenser connected to said second junction point for selectively applying a first bias voltage thereto, a second unilaterally conductive element connected between said second junction point and a third junction point, said second and first unilaterally conductive elements being poled alike for current conduction in one direction, a second bias winding having two terminals wound on the second one of said cores, said second bias winding having one terminal connected to said third junction point, a third unilaterally conductive element connected between said third junction point and a fourth junction point, a fourth unilaterally conductive element connected between said fourth junction point and a fifth junction point, said third and fourth unilaterally conductive elements being poled for conducting current in a direction opposite to said one direction, means including a second storage condenser connected to said fourth junction point for selectively applying a second bias voltage thereto, means for applying a third bias voltage to the other terminal of said second bias winding, said third bias voltage neutralizing the effect of said first and second bias voltages respectively upon said second and third unilaterally conductive elements, said bias voltages being applied while the shift pulses endure to determine the conductivity of said unilaterally conductive elements; whereby information stored in one of said cores is transferred to the other core upon the application of said shift pulses.

4. A multi-stage, reversible magnetic shift register for processing at least two bits of binary coded information comprising, a series of bistable magnetic cores, each core having a substantially rectangular hysteresis characteristic, a plurality of shift pulse windings each having first and second terminals, first terminals of said shift pulse windings being serially connected to second terminals of subsequent shift pulse windings, means for applying shift pulses to said serially connected windings, a plurality of bias windings each having first and second terminals, a first register stage comprising a first one of said series of cores having a first one of said plurality of shift pulse windings and a first one of said plurality of bias windings, the aforesaid windings being arranged on said first core to have signals on their respective first terminals in phase when there is a change in the magnetic state of said first core, said first bias winding having its first terminal connected to a first junction point and its second terminal connected to ground, a first diode rectifier connected between said first junction point and a second junction point, a first bias terminal, a first condenser connected between said second junction point and said first bias terminal, a second diode rectifier connected between said second junction point and a third junction point, said first and second diode rectifiers being poled alike for conducting current in the forward direction; a second register stage comprising a second one of said plurality of cores having a second shift pulse winding and a second bias winding, said second windings being arranged on said second core so that a signal on the first terminal of said second shift pulse winding is in phase with a signal on the second terminal of said second bias winding when there is a change in the magnetic state of said second core, a second bias terminal, said second bias winding having its first terminal connected to said third junction point and its second terminal connected to said second bias terminal, a third diode rectifier connected between said third junction point and a fourth junction point, a third bias terminal, a second condenser connected between said fourth junction point and said third bias terminal, a fourth diode rectifier connected between said fourth junction point and the bias winding of a subsequent stage, said third and fourth diode rectifiers being poled alike for conducting current in the reverse direction, means for applying bias pulses in synchronism with said shift pulses, said second bias terminal being coupled to the bias pulse means, switching means adapted to selectively couple one of said first or third bias terminals to said bias pulse means while coupling the other of said first or third bias terminals to ground; whereby said register may be switched to transfer information stored in one of said cores to either a subsequent core or a preceding one in the series, upon the application of said shift pulses.

5. In a reversible magnetic shift register apparatus comprising: a bistable magnetic core having a shift winding and a transfer winding, first and second storage capacitors, one end of the transfer winding being connected by a first diode to the first storage capacitor and connected by a second diode to the second storage capacitor, a switch, each of the storage capacitors being connected to the switch, a source of bias pulses connected to the switch, the other end of the transfer winding being connected to one output terminal of the bias pulse source, and the switch being arranged to permit an induced voltage across the transfer winding to charge one of the storage capacitors while applying a bias pulse from the source to prevent charging of the other storage capacitor.

6. Reversible magnetic shift register apparatus according to claim 5, further including, a second bistable magnetic core having a shift winding and a transfer winding, a source of shift pulses connected to the shift windings of the magnetic cores, the transfer winding of the second core having one end connected by a third diode to the first storage capacitor and its other end maintained at the same potential as the other output terminal of the bias pulse source, the third diode being arranged to permit the storage capacitor to discharge through the second core's transfer winding at the conclusion of a shift pulse.

7. A reversible shift register comprising: a series of bistable magnetic cores, means for simultaneously applying shift pulses to each core in the series, each of the cores having a single transfer winding, data transfer means linking the transfer winding of each intermediate core to the transfer winding of the next preceding and next succeeding core in the series, a source of biasing pulses, and a switch for coupling the biasing pulses to the data transfer means, the switch determining the direction of data transfer in the series of cores.

References Cited in the file of this patent

UNITED STATES PATENTS

| | | |
|---|---|---|
| 2,781,503 | Saunders | Feb. 12, 1957 |
| 2,785,390 | Rajchman | Mar. 12, 1957 |
| 2,825,890 | Ridler et al. | Mar. 4, 1958 |
| 2,953,775 | Newhouse et al. | Sept. 20, 1960 |

OTHER REFERENCES

"Magnetic Cores as Elements of Digital Computing Systems," a thesis by Monroe Haynes, December 28, 1950, University of Illinois, pages 46–50.